United States Patent
Clohessy et al.

(10) Patent No.: US 7,334,228 B2
(45) Date of Patent: Feb. 19, 2008

(54) RUNTIME-RESOURCE MANAGEMENT

(75) Inventors: Kim Clohessy, Scottsdale, AZ (US); John Duimovich, Ottawa (CA); Trent Gray-Donald, Ottawa (CA); Berthold Lebert, Phoenix, AZ (US); Ryan Sciampacone, Nepean (CA); Peter Duncan Shipton, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 09/917,507

(22) Filed: Jul. 27, 2001

(65) Prior Publication Data

US 2003/0023661 A1  Jan. 30, 2003

(51) Int. Cl.
G06F 9/46 (2006.01)
G06F 15/16 (2006.01)

(52) U.S. Cl. ................................ 718/104; 709/203

(58) Field of Classification Search ........ 718/103–104; 709/104, 203
See application file for complete search history.

(56) References Cited

U.S. PATENT DOCUMENTS

| | | | | |
|---|---|---|---|---|
| 4,750,116 | A | * | 6/1988 | Pham et al. ................ 718/104 |
| 5,809,554 | A | | 9/1998 | Benayon et al. ............. 711/171 |
| 5,826,082 | A | * | 10/1998 | Bishop et al. ............... 718/104 |
| 5,915,085 | A | * | 6/1999 | Koved ............................ 726/1 |
| 5,991,792 | A | * | 11/1999 | Nageswaran ................ 718/104 |
| 6,029,000 | A | * | 2/2000 | Woolsey et al. ............. 717/147 |
| 6,058,460 | A | | 5/2000 | Nakhimovsky .............. 711/153 |
| 6,282,561 | B1 | * | 8/2001 | Jones et al. .................. 718/104 |
| 6,317,742 | B1 | * | 11/2001 | Nagaratnam et al. ........... 707/9 |
| 6,402,028 | B1 | * | 6/2002 | Graham et al. ............... 235/380 |
| 6,477,561 | B1 | * | 11/2002 | Robsman ..................... 718/105 |
| 6,542,920 | B1 | * | 4/2003 | Belkin et al. ................ 718/104 |
| 6,611,693 | B2 | * | 8/2003 | Soini et al. .................. 455/566 |
| 6,766,353 | B1 | * | 7/2004 | Lin et al. ..................... 709/203 |
| 6,910,210 | B1 | * | 6/2005 | Chew .......................... 718/103 |
| 6,941,379 | B1 | * | 9/2005 | Dingsor et al. .............. 709/235 |
| 6,963,730 | B2 | * | 11/2005 | Chambers et al. ......... 455/67.11 |
| 7,020,878 | B1 | * | 3/2006 | Rhee et al. .................. 718/104 |
| 7,096,248 | B2 | * | 8/2006 | Masters et al. .............. 709/201 |
| 7,146,353 | B2 | * | 12/2006 | Garg et al. ...................... 707/2 |
| 2003/0046396 | A1 | * | 3/2003 | Richter et al. ............... 709/226 |

FOREIGN PATENT DOCUMENTS

EP  0969379 A2  6/1999

OTHER PUBLICATIONS

Author: Grzegorz Czajkowski and Thorsten von Eicken, Title: "JRES: A Resouce Accounting Interface for Java", Date: Oct. 1998, pp. 15, Published: In Proceedings of the 1998 ACM OOPSLA Conference.

* cited by examiner

Primary Examiner—Meng-AL T. An
Assistant Examiner—Camquy Truong
(74) Attorney, Agent, or Firm—Synnestvedt & Lechner LLP

(57) ABSTRACT

A runtime-resource management method, system, and product for managing resources available to application components in a portable device. The method, system, and product provide for loading one or more new application components into a portable device only if maximum runtime resources required by the one or more new application components are available in the portable device assuming loaded application components within the device are using the maximum runtime resources reserved by the loaded application components, reserving maximum runtime resources required by application components when application components are loaded into the portable device, and running loaded application components using only the runtime resources reserved for the loaded application components.

16 Claims, 7 Drawing Sheets

RUNTIME-RESOURCE MANAGEMENT

FIELD OF THE INVENTION

The present invention relates to computer systems and, more particularly, to a resource management method, system, and product for managing runtime resources in portable devices.

BACKGROUND OF THE INVENTION

Portable devices such as cellular telephones and personal digital assistants (PDAs) have become commonplace in today's society. Many of these portable devices are capable of receiving, loading, and running small software applications called application components. Due to portability and price constraints, however, these portable devices are designed using small and inexpensive hardware components, which limit the amount of system resources available within the portable device. The system resources include flash memory that is used for storing application components, and runtime system resources such as random access memory (RAM), threads, and sockets, that are used when application components are running.

An appealing aspect of these portable devices is that an operator of a portable device can choose the application components that will be available on the portable device. The operator can load and unload application components from the portable device, thereby permitting customization of the portable device by the operator and, in contrast to the typical operator of a desktop PC, this loading and unloading process for portable devices may occur with great frequency given the limited amount of flash memory available in the portable devices for storing application components.

In traditional portable devices, attempting to run several application components simultaneously can exhaust the available runtime system resources, thereby resulting in improper operation of the application components such as slow response times and error messages. For example, if a portable device has 8 MB of RAM available, a first application component running that is using 3 MB of RAM, and a second application component running that is using 5 MB of RAM, running a third application component that will attempt to use 1 MB of RAM may result in improper operation of all three application components.

In addition, application components for use with portable devices are available from a wide range of software developers ranging from well-known companies to unknown $3^{rd}$ party vendors. Although application component development by a wide range of software developers benefits the operators of portable devices by increasing competition and selection, poorly designed application components, or application components intentionally designed to be destructive (e.g., viruses), can easily impair a portable device by exhausting the portable device's runtime system resources. For example, if a portable device has 8 MB of RAM available and a particular application component uses all 8 MB of RAM, the operator may be unable to run other application components simultaneously without experiencing improper operation of the running application components.

Accordingly, there is a need for improved resource-management methods, systems, and products which protect runtime system resources from poorly designed or destructive application components. The present invention fulfills this need among others.

SUMMARY OF THE INVENTION

The present invention overcomes the aforementioned problems by providing, for use in a portable device, a resource management method, system, and product that insures that sufficient runtime resources are available for running a new application component in the portable device, even if all application components already loaded into the portable device are using the maximum amount of runtime resources reserved for their use, prior to loading the new application component. When the new application component is loaded into the portable device, runtime resources are reserved for use by that application component. Each loaded application component is then run using only the reserved runtime resources for that particular application component.

By loading a new application component only if sufficient runtime system resources are currently available; reserving runtime system resources when the new application component is loaded; and running loaded application components using only the runtime system resources reserved for those loaded application components, the present invention insures that each loaded application component will always have a sufficient amount of runtime resources to execute properly. Accordingly, the present invention prevents improper operation of loaded application components due to running too many application components simultaneously, poorly designed application components, and/or destructive application components.

An aspect of the present invention is a runtime-resource management-method for use with a portable device that includes identifying one or more new application components having an associated resource description list (RDL), determining maximum required runtime resources for the one or more new application components from the associated RDLs, determining currently available runtime system resources in the portable device assuming application components that are already loaded are using the maximum amount of runtime resources reserved for their use (CARSR-MAX), comparing the maximum required runtime resources to the CARSRMAX, and prohibiting the one or more new application components from loading if the CARSRMAX is less than the maximum required runtime resources.

Another aspect of the present invention is a runtime-resource management-method that includes reserving runtime system resources in a portable device for each application component loaded into the portable device. The method further includes running one or more of the loaded application components using no more that the maximum required runtime resources reserved for each of the one or more loaded application components.

Yet another aspect of the present invention is a runtime-resource management-method that includes removing one or more loaded application components from a portable device at the direction of an operator of the portable device and releasing maximum runtime resources reserved for use by the one or more loaded application components.

In addition, the present invention encompasses a system and computer program product embodied in a computer readable medium for carrying out the runtime-resource management-method of the present invention.

BRIEF DESCRIPTION OF THE DRAWINGS

Embodiments of the invention will now be described in detail in association with accompanying drawings, in which.

DETAILED DESCRIPTION OF THE INVENTION

Figure 1:
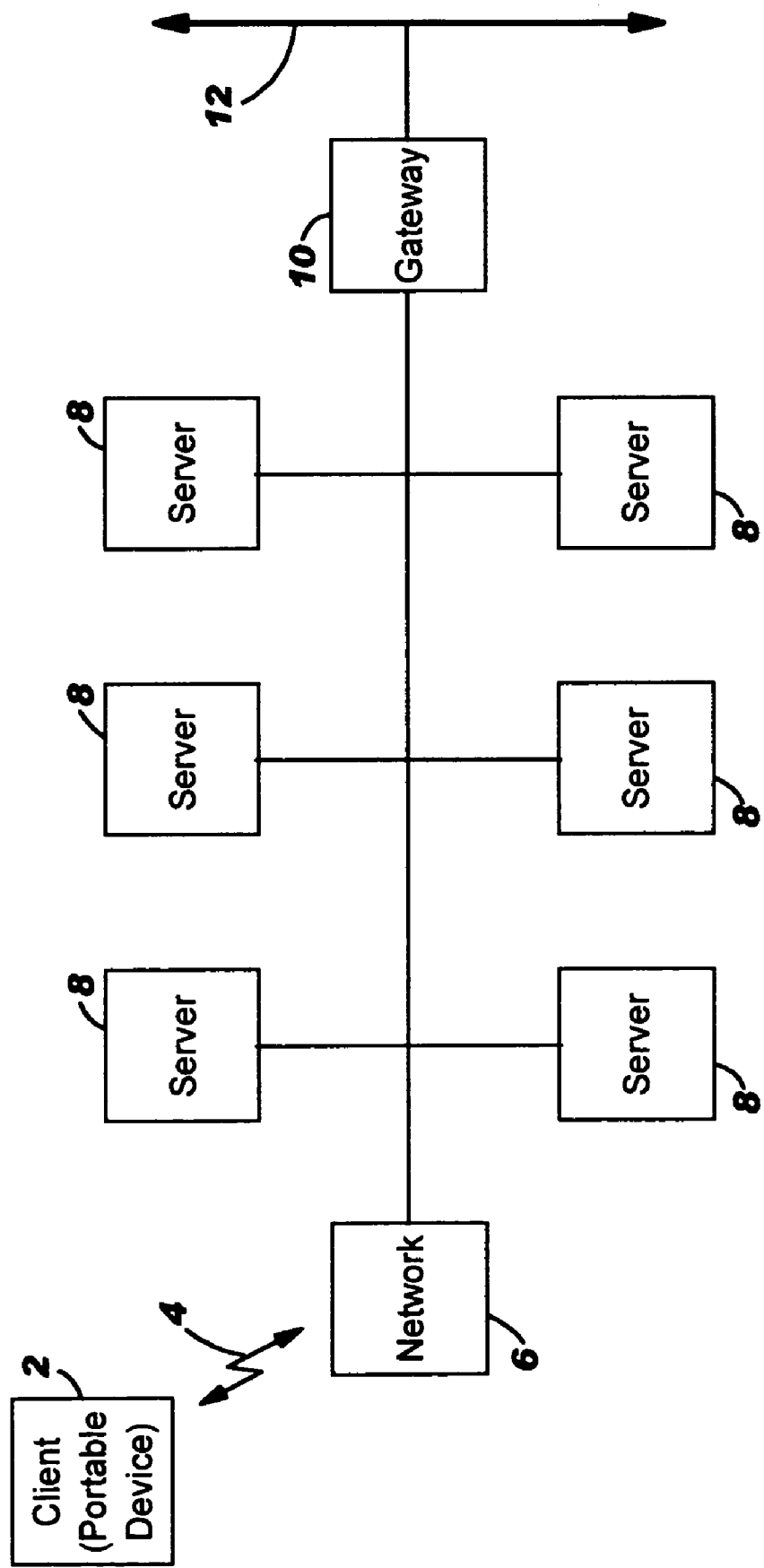
FIG. 1 is a schematic diagram of a computer network through which the present invention may be practiced.

FIG. 1 schematically illustrates a client-server networking environment in which a client (portable device) 2 communicates with a local network 6 via a connection 4. The connection 4 may be a physical connection (e.g., a docking station or "cradle") or a wireless connection. The network 6 connects a plurality of specialized servers 8, such as application servers, content servers, user data servers, billing systems, proxy servers and user administration servers, which store application components for installation into the portable device 2. The network 6 may also have a gateway 10 to an external network 12, such as the Internet.

Figure 2A:
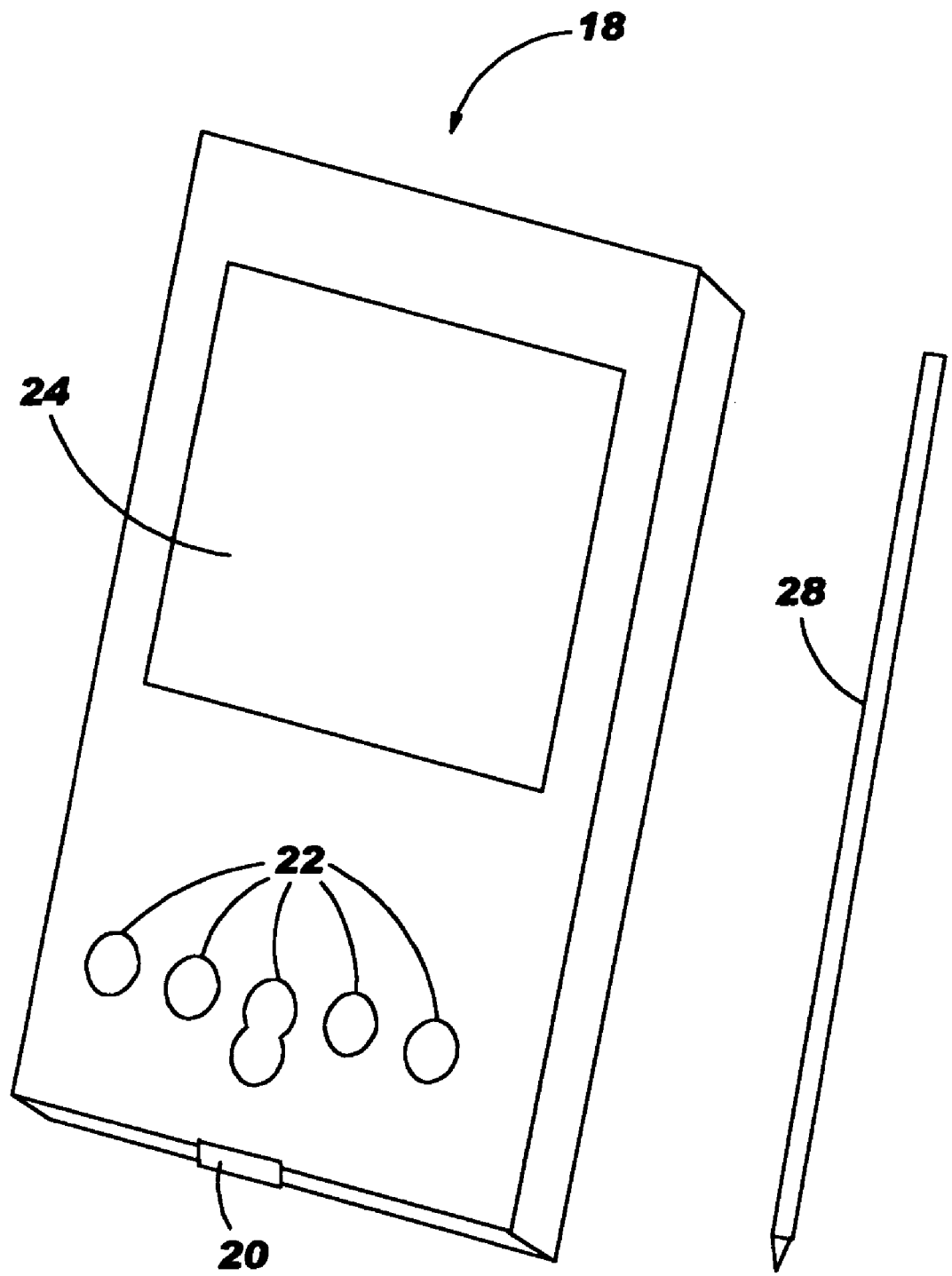
FIG. 2A is a pictorial representation of an exemplary portable device in which the present invention may be practiced.
Figure 2B:
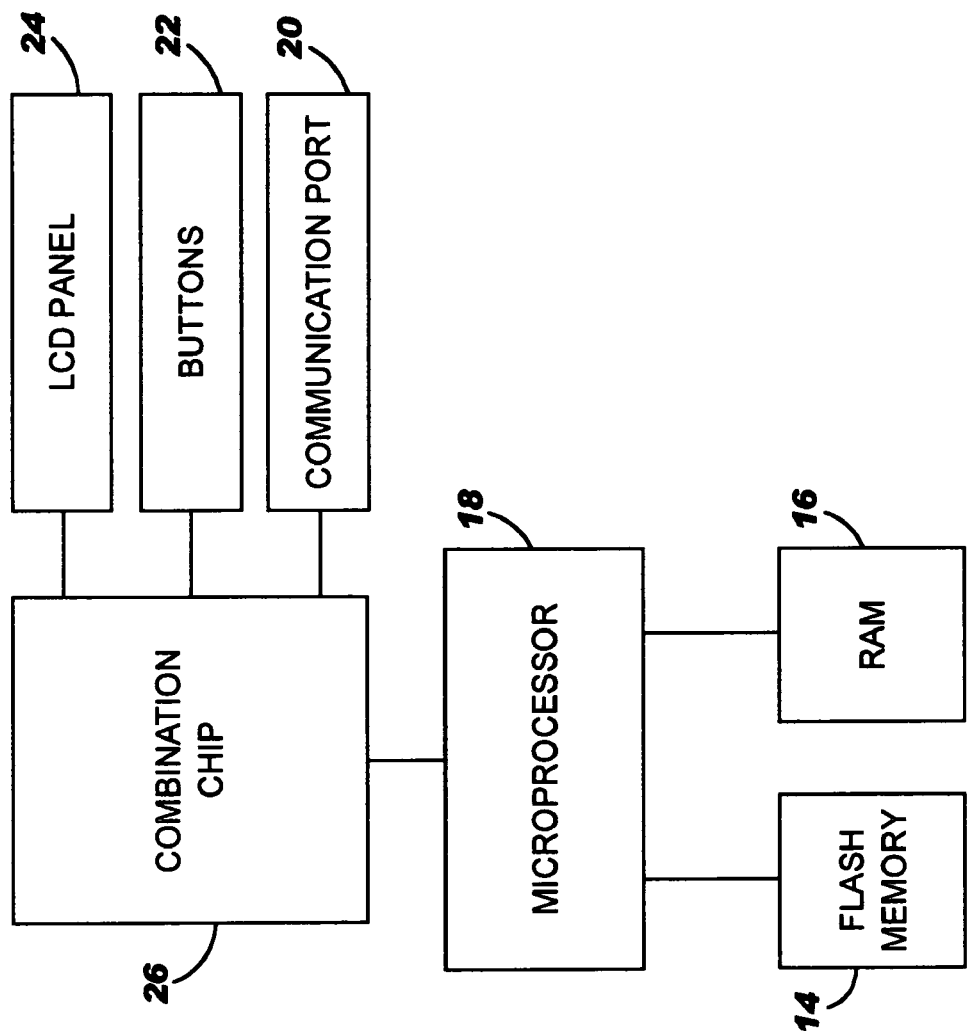
FIG. 2B is a block diagram of the hardware within the exemplary portable device of FIG. 2A.

FIG. 2A is a pictorial representation of an exemplary portable device 18 for use with the present invention, and FIG. 2B is a functional block diagram of the hardware within the exemplary portable device 18. As illustrated in FIGS. 2A and 2B, the exemplary portable device 18 includes flash memory 14, RAM 16, a microprocessor 18, a communication port 20 capable of communicating with a network 6 (FIG. 1), buttons 22, a liquid crystal display (LCD) panel 24, and a combination chip 26 for performing interface operations between the microprocessor 18 and the communication port 20, buttons 22, and LCD panel 24. The exemplary portable device 18 may further include a stylus 28 and other components or circuitry (e.g., PCM/CIA card slots, a power supply, wireless circuits and antenna, add-ons, etc.) found in a conventional portable device such as discussed in U.S. Pat. No. 5,666,530 to Clark et al. issued on Sep. 9, 1997, which is fully incorporated herein by reference. Although the exemplary portable device 18 is a personal digital assistant (PDA) such as the iPAQ Pocket PC manufactured by Compaq Computer, Inc., other types of portable devices including, but not limited to, cellular telephones, pagers, embedded devices, and other portable electronic devices could be used in accordance with the present invention.

Figure 3:
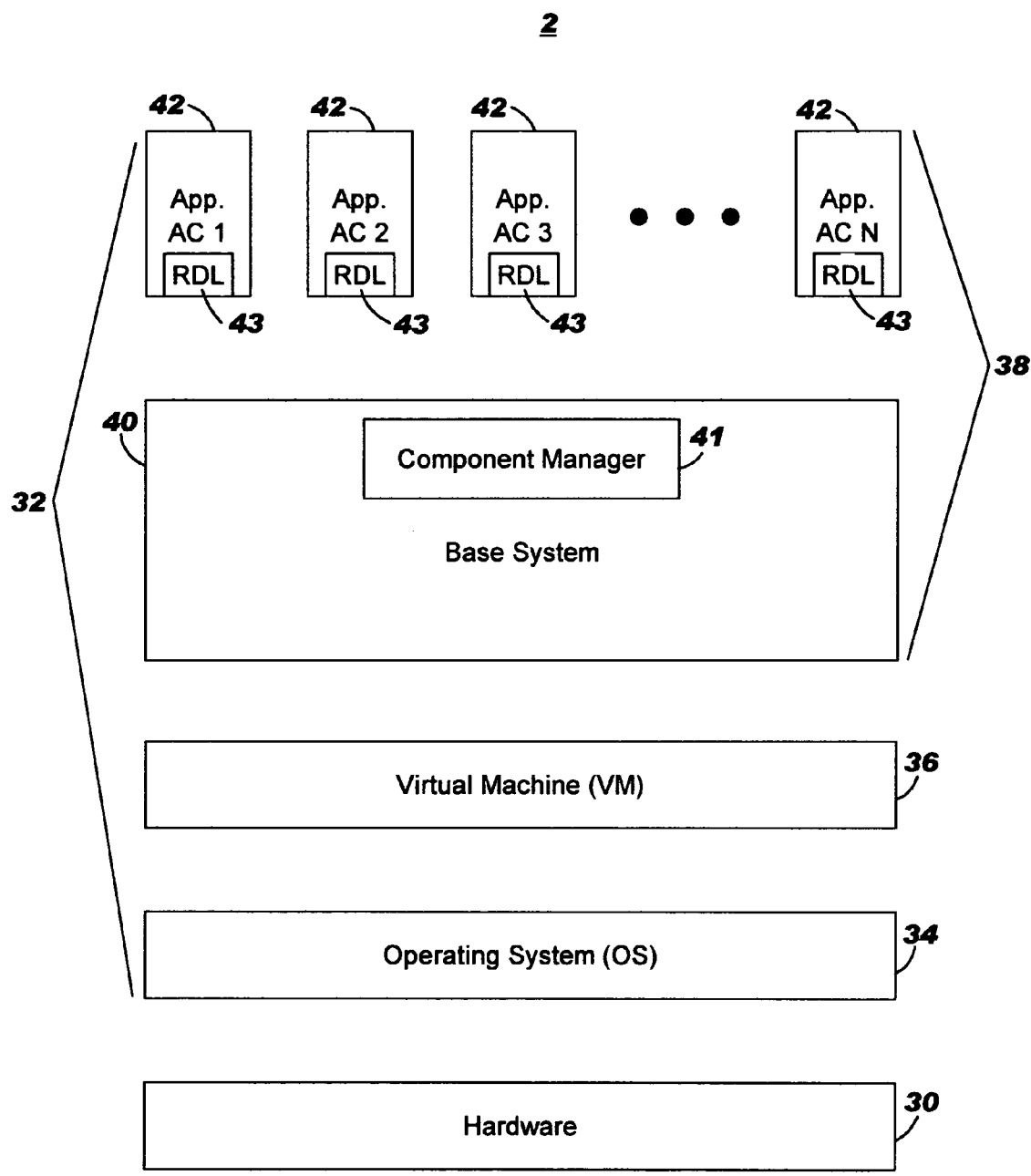
FIG. 3 is a schematic diagram of a portable device in which the present invention may be practiced.

FIG. 3 schematically illustrates a preferred hardware and software configuration of a portable device 2 for use in accordance with the present invention. The configuration of the portable device 2 includes hardware element 30 and several software elements 32. The hardware element 30 and software elements 32 provide support for one or more application components 42 within the portable device 2 such as an address book and calendar, The hardware element 30 includes flash memory, RAM, and a microprocessor such as the flash memory 14, RAM 16, and microprocessor 18 within the exemplary portable device 18 (FIGS. 2A and 2B). Flash memory is a computer readable medium used for storing the one or more application components 42 and program code for performing the steps of the present invention, RAM is used when the application components 42 are running (i.e., a runtime resource), and the microprocessor is used to run the one or more application components 42 and the program code of the present invention.

The total amount of RAM available within the portable device 2 is a finite amount which is set when the portable device 2 is manufactured. In the present invention, a portion of RAM is available to run the one or more application components 42. The portion of RAM available for running the one or more application components 42 is controlled by a system developer via the VM 36 (discussed below). The present invention is directed toward the management of runtime resources used by the one or more application components 42. Accordingly, for descriptive purposes, the portion of RAM used to run the one or more application components 42 are referred to herein as simply RAM.

A first software element 32 is a conventional operating system (OS) 34 and its associated device drivers. The OS 34 is ported (i.e., operatively coupled) to the hardware element 30 of the portable device 2. In portable devices, the OS 34 typically comprises a real-time operating system (RTOS), which is used due to size constraints and performance requirements. The OS 34 determines the total number of threads and the total number of sockets available in the portable device 2.

Threads and sockets are well-known runtime resources. Threads permit the performance of multiple tasks at the same time while sockets facilitate connections among the one or more application components 42, other applications in the portable device, hardware components in the portable device 2, and/or applications and hardware components external to the portable device 2. A portion of the total number of threads and a portion of the total number of sockets in the portable device are available to run the one or more application components 42. The portion of the total number of threads and the portion of the total number of sockets available for running the one or more application components 42 are controlled by a system developer via the VM 36. As discussed above in reference to RAM, the present invention is directed toward the management of runtime resources used by the one or more application components 42. Accordingly, for ease of description, the portion of the total number of threads and the portion of the total number of sockets are referred to herein as simply the total number of threads and the total number of sockets, respectively.

A second software element 32 is a virtual machine (VM) 36, which is ported to the OS 34. The VM 36 provides an execution environment for the portable device 2. It maps the data and logic of application components 42 running on the portable device 2 to the OS 34. In a preferred embodiment, as discussed above, the VM 36 is used by a system developer to control the total amount of RAM, the total number of threads, and the total number of sockets available for running application components 42. In addition, preferably, the VM 36 contains functions (i.e., procedures that perform distinct programming tasks). In the preferred embodiment, the following functions are present in the VM 36:

1. Function to reserve a segment of RAM for each application component 42;

2. Function to monitor the amount of RAM each application component 42 is using;

3. Function to monitor the number of threads each application component 42 is using; and 4. Function to monitor the number of sockets each application component 42 is using.

Preferably, the function for reserving a segment of RAM is invoked by a component manager 41 (described below) when each of the application components 42 is loaded into the portable device 2, the function for monitoring the amount of RAM each application component 42 is using is invoked when a request for RAM is made to the VM 36 by one of the application components 42, the function for monitoring the number of threads each application component 42 is using is invoked by the component manager 41 when a thread is requested by one of the application components 42, and the function for monitoring the number of sockets each application component 42 is using is invoked by the component manager 41 when a socket is requested by one of the application components 42. A suitable VM 36 containing the above functions for use with the present invention is the IBM J9 VM developed by IBM®.

A third software element 32 is an application element 38. The application element 38 includes a base system 40 and one or more application components 42. Each application component 42 has an associated resource description list (RDL) 43. Each RDL 43 includes runtime resource requirements (e.g., RAM, thread, and socket requirements) of its associated application component 42. The runtime resource requirements in an RDL 43 of an associated application component 42 are an estimate of the maximum number of runtime system resources that the application component 42 will use when it is running. Typically, each RDL 43 is created by the software developer of its associated application component 42 and each application component 42 will use no more than the runtime resource requirement in its associated RDL 43. If an RDL 43 of an associated application component 42 contains erroneous information (either unintentionally or intentionally, e.g., viruses), however, that application component 42 could attempt to use more than the runtime resource requirements in its associated RDL 43.

In a preferred embodiment, each RDL 43 includes the amount of RAM, the number of threads, and the number of sockets that associated application components 42 will use when they are running. Additional runtime resources may be included in the RDL 43 for use with the present invention depending on the runtime resources that a system developer decides to monitor and control. Preferably, each RDL 43 is stored with its associated application component 42 in a single file such as a JAVA™ Archive (JAR) file or J9 executable (JXE) file that can be run by the IBM J9 VM. Presently, the Service Gateway specification developed by the Open Service Gateway initiative (OSGi) requires that each application component 42 have an associated RDL 43 that includes runtime resource requirements for the amount of RAM, the number of threads, and the number of sockets for the associated application component 42. Accordingly, each application component 42 developed in accordance with the OSGi Service Gateway specification can be used with the present invention.

The base system 40 provides the basic functionality such as the runtime environment and common data types for the one or more application components 42. In a preferred embodiment, the base system 40 includes a component manager 41. In the preferred embodiment, the component manager 41 performs a number of tasks including: determining runtime resource requirements for application components 42 prior to loading the application components 42 into the portable device 2; determining currently available runtime system resources in the portable device 2 assuming each application component 42 already loaded into the portable device is using the maximum number of runtime resources reserved for its use; comparing maximum required runtime resources to currently available runtime system resources; initiating the loading of application components 42 if the currently available runtime resources accommodate the maximum required runtime resources; instructing the VM 36 to allocate a quantity of RAM to each application component 42 when application components 42 are loaded into the portable device 2; writing thread requirements for each application component 42 to a thread table accessible by the VM 36; writing socket requirements for each application component 42 to a socket table accessible by the VM 36; initiating the function in the VM 36 to monitor the number of threads used by each application component 42 when each application component 42 requests a thread; initiating the function in the VM 36 to monitor the number of sockets used by each application component 42 when each application component 42 requests a socket; instructing the VM 36 to release the quantity of RAM allocated to one or more loaded application components 42 when the one or more loaded application components 42 are removed from the portable device 2; and removing entries associated with the one or more loaded application components 42 from the thread table and the socket table when the one or more loaded application components are removed from the portable device 2.

Figure 4:
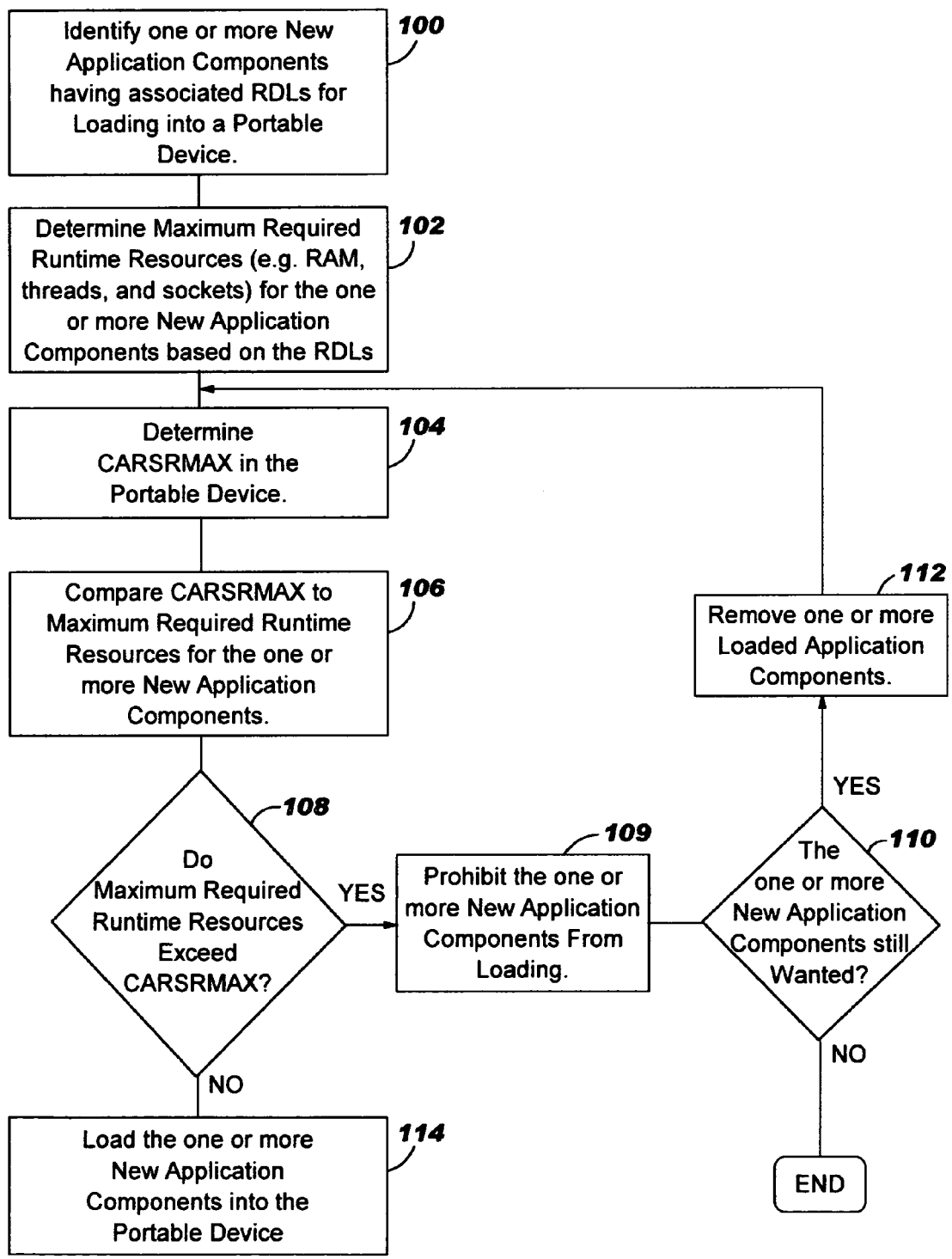
FIG. 4 is a flow diagram depicting loading one or more new application components into a portable device in accordance with the present invention.
Figure 5:
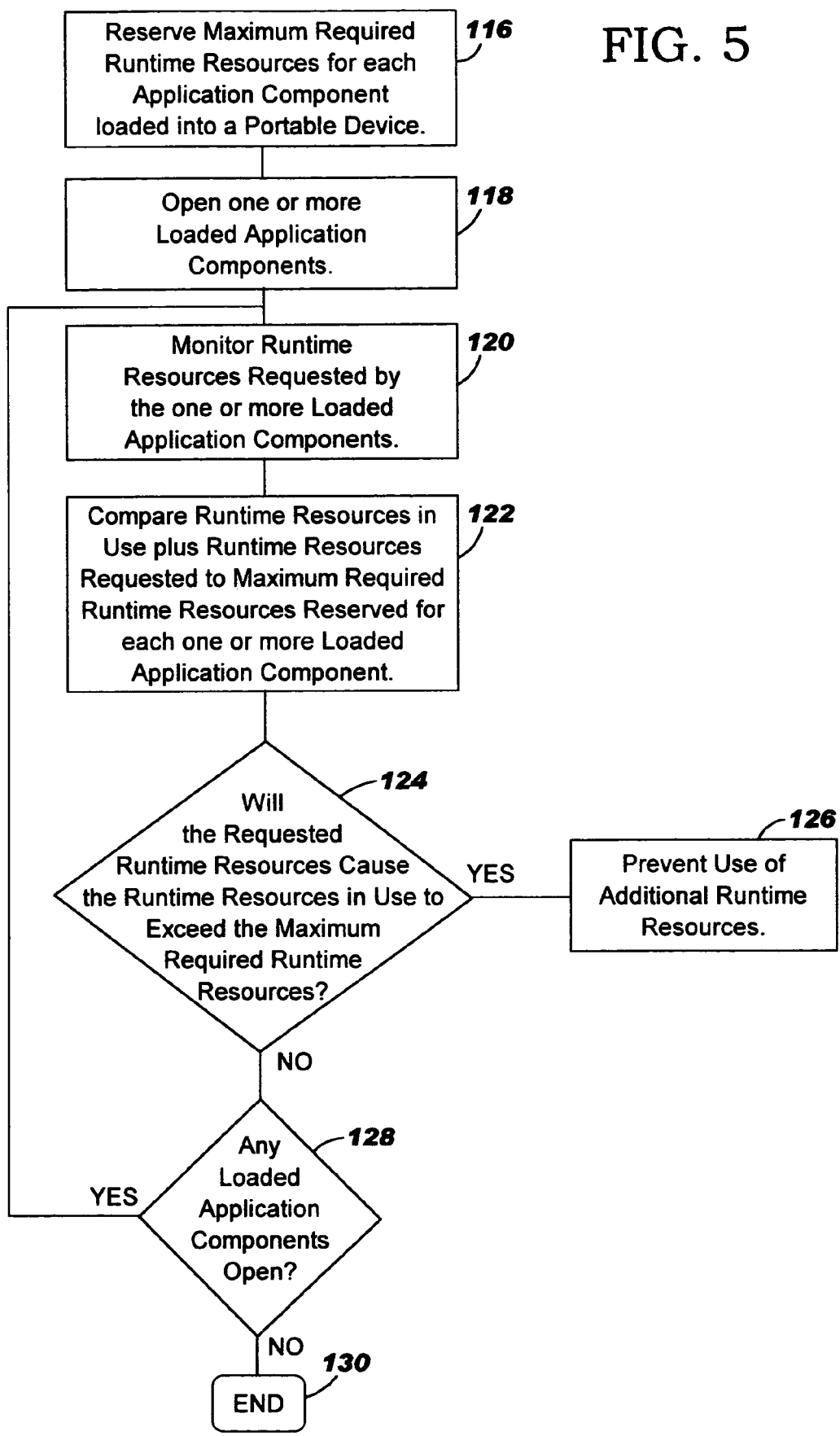
FIG. 5 is a flow diagram depicting reserving maximum required runtime resources for each application component loaded into a portable device and running one or more loaded application components using no more than the maximum required runtime resources reserved for each of the one or more loaded application components in accordance with the present invention.
Figure 6:
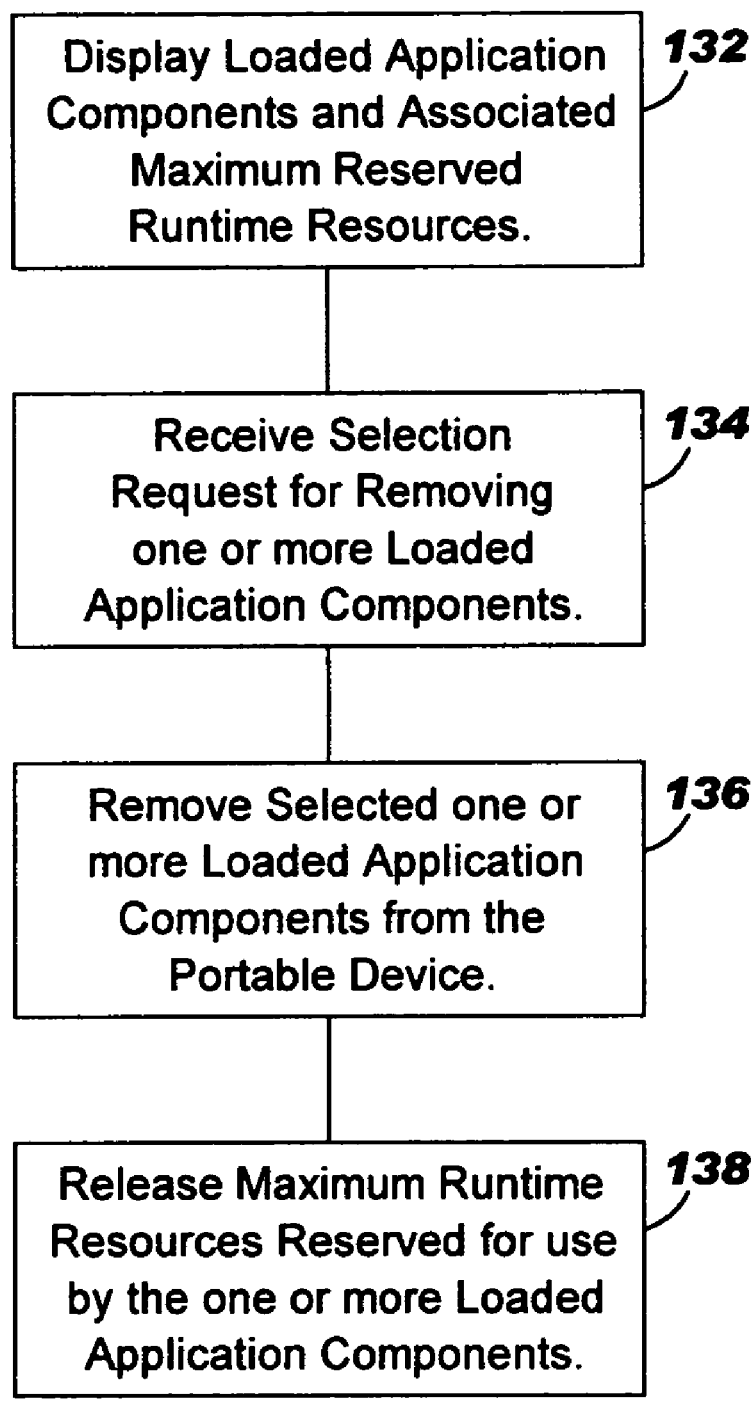
FIG. 6 is a flow diagram depicting the removal of one or more loaded application components in accordance with the present invention.

FIG. 4, FIG. 5, and FIG. 6 are flow diagrams illustrating an example of the steps of the present invention. FIG. 4 describes loading one or more new application components into a portable device, FIG. 5 describes reserving maximum required runtime resources for each loaded application components when they are loaded into the portable device and running the one or more loaded application components using the reserved maximum required runtime resources, and FIG. 6 describes the removal of one or more loaded application components. FIG. 4, FIG. 5, and FIG. 6 will be described in detail below.

The steps depicted in FIG. 4 are employed when one or more new application components are to be loaded into a portable device. At step 100, one or more new application components having associated RDLs 43 (FIG. 3), e.g., application components in accordance with the OSGi Service Gateway Specification, are identified for loading into the portable device. Preferably, the one or more new application components are identified by an operator of the portable device. For example, the operator of the portable device may identify a new application component which offers a new or upgraded application (e.g., adding "calendaring" to a cellular telephone). Alternatively, a server could identify one or more new application components required to upgrade/update an application component already stored in the portable device. In yet another embodiment, a system administrator responsible for maintaining the system of the portable device could identify one or more new application components to be loaded into the portable device. Single or multiple new application components may be identified by the operator for loading or an identified new application component may have prerequisite application components that are automatically identified for loading when identifying the new application component.

At step 102, maximum runtime resources required by the one or more new application components identified in step 100 are determined. As noted above, each new application component has an associated RDL 43 (FIG. 3) that includes information regarding the required runtime resource for running that application component, so that, for example, the RAM requirement, the thread requirement, and the socket requirement can be determined.

The maximum required runtime resources for the one or more new application components are read from the RDLs associated with the one or more new application components that have been identified for downloading. The RDLs may be read using software within the portable device or residing on the server through which the one or more new application components will be transferred to the portable device. In the preferred embodiment, the component manager 42 (FIG. 3) reads the RDLs to determine the maximum required runtime resources. If multiple new application components are identified in step 100, the maximum required runtime resources are the totals of the maximum required runtime resources for each identified one or more new application components.

At step 104, currently available runtime system resources in the portable device are determined assuming that all application components already loaded into the portable device are using the maximum required runtime resources according to their associated RDLs 42 (FIG. 3). For descriptive purposes, the currently available runtime system resources assuming that all application components already loaded are using their maximum required runtime resources will be referred to herein as the CARSRMAX. The CARSRMAX is calculated by reducing the total amount of runtime system resources available on the portable device for running application components by the amount of resources reserved for all application components already loaded into the portable device. For example, if the portable device has a total of 8 MB of RAM, 100 threads and 10 sockets available for use by application components, a first loaded application component that has 3 MB of RAM, 20 threads, and 3 sockets reserved for its use, and a second application component which has 4 MB of RAM, 25 threads, and 2 sockets reserved for its use, the CARSRMAX is 1 MB of RAM (8 MB−3 MB−4 MB=1 MB), 55 threads (100−20−25=55), and 5 sockets (10−3−2=5). In the preferred embodiment, the component manager 41 (FIG. 3) is configured to calculate the CARSRMAX in the portable device.

At step 106, the CARSRMAX determined in step 104 is compared to the maximum required runtime resources of the identified one or more new application components as determined in step 102. In the preferred embodiment, the component manager 41 (FIG. 3) compares the CARSRMAX to the maximum required runtime resources stored in the RDLs 43 associated with the identified one or more new application components. In an alternative embodiment, the portable device sends a file containing CARSRMAX to a server through which the new application component will be delivered. The server then compares the CARSRMAX to the maximum required runtime resources of the new application component to be downloaded. Various alternative embodiments will be readily apparent to those skilled in the art and are considered within the scope of the present invention.

At step 108, a decision is made based on the comparison made in step 106. If the CARSRMAX is equal to or exceeds the maximum required runtime resources (i.e., the CARSRMAX accommodates the maximum required runtime resources), the identified one or more new application components will be loaded into the portable device at step 114. If the maximum required runtime resources exceed the CARSRMAX, the identified one or more new application components will be prohibited from loading into the portable device at step 109. For example, if the CARSRMAX is 1 MB of RAM, 55 threads, and 5 sockets and the one or more new application components' maximum runtime resource requirements are 1 MB of RAM, 25 thread, and 3 sockets, the new application component would be loaded. If, on the other hand, the one or more new application components' maximum runtime resource requirements are 1 MB of RAM, 60 threads, and 4 sockets, the one or more new application components would be prohibited from loading into the portable device since the maximum runtime resource requirement for threads exceeds the CARSRMAX by 5 threads. In the preferred embodiment, the component manager in the base system 40 (FIG. 3) of the portable device makes the decision in step 108. In an alternative embodiment, the server through which the one or more new application components will be delivered makes the decision.

At step 110, the operator of the portable device will make a decision regarding whether the identified one or more new application components should be loaded despite the insufficiency of the CARSRMAX. If the operator decides not to load the identified one or more new application components, the process ends. If the operator decides to load the identified one or more new application components, at step 112, one or more application components previously loaded into the portable device are removed from the portable device at the direction of the operator and the maximum required runtime resources reserved for use by the one or more previously loaded application components are released. Details regarding the removal of loaded application components are described in detail in reference to FIG. 6 below.

After one or more previously loaded application components are removed from the portable device, the CARSRMAX will again be determined and compared to the maximum required runtime resources for the one or more new application components at steps 104 and 106, respectively. This process is repeated until the CARSRMAX equals or exceeds the maximum required runtime resources, or the operator decides not to load the identified one or more new application components.

At step 114, the identified one or more new application components are loaded into the portable device. In the preferred embodiment, the new application component is downloaded from a network server to the portable device in a known manner. A suitable method for downloading one or more new application components into a portable device is discussed in an application titled "Loading and Unloading Application Components" (IBM Docket No. CA9-99-004), which is commonly assigned, incorporated fully herein by reference. In the preferred embodiment, the loading of the one or more new application components is initiated by the component manager 41.

Conceptually, the steps of FIG. 4 are used to guard against multiple application components running on a portable device interfering with the maximum runtime resource requirements of one another. Assuming that the RDLs of all application components loaded into a portable device are accurate, by determining the CARSRMAX and only loading the one or more new application components identified at step 100 if the CARSRMAX accommodates the maximum runtime resource requirements of the one or more new application components, the present invention insures that each application component loaded into the portable device will always have runtime system resource for its use even if all application components loaded into the portable device are running simultaneously and each application component is using its maximum runtime system resources.

For example; assume that the total runtime resources in a portable device are 8 MB of RAM, 100 threads, and 10 sockets; a first loaded application component requires 2 MB of RAM, 10 threads, and 2 sockets; a second loaded application component requires 3 MB of RAM, 15 threads, and 2 sockets; and a new application component requires 2 MB of RAM, 15 threads, and 3 sockets. In the present example, the CARSRMAX is 3 MB of RAM, 75 threads, and 6 sockets. Since the runtime resource requirements of the new application component are within the CARSRMAX, the new application component will be loaded into the portable device and, assuming all the RDLs are accurate, each application component within the portable device will have enough runtime resources to run on the device even if all application components are running at the same time. If, on the other hand, the new application component requires 2 MB of RAM, 15 threads, and 7 sockets, the new application component exceeds the CARSRMAX socket requirement and, if loaded, would cause potential problems when all application components were running. Since the new application would exceed the CARSRMAX socket requirement, the new application component would not be loaded, thereby avoiding the potential depletion of runtime resources that could cause improper operation of application components running on the portable device.

The above example regarding the steps of FIG. 4 assumes that the RDLs of the associated application components are accurate. If, however, the RDLs are inaccurate, the steps depicted in FIG. 4 will be ineffective at preventing runtime resources from being depleted if application components with inadequate runtime resources listed in their associated RDLs are loaded into the portable device. For example; if the total runtime resources in a portable device are 8 MB of RAM, 100 threads, and 10 sockets; a first loaded application component requires 2 MB of RAM, 10 threads, and 2 sockets according to its associated RDL; the first loaded application component actually uses 2 MB of RAM, 90 threads, and 10 sockets; and a new application component requires 2 MB of RAM, 12 threads and 2 sockets; the steps depicted in FIG. 4 would allow the new application component to be loaded into the portable device since the maximum required runtime resources are within the CARSRMAX (6 MB RAM, 90 threads, and 8 sockets). In this example, however, when both application components are running, they could potentially require 4 MB of RAM, 102 threads, and 12 sockets, which would exceed the total runtime resources for threads and sockets available in the portable device, thereby resulting in the potential for improper operation of running application components due to the depletion of runtime system resources. The steps depicted in FIG. 5 will prevent the depletion of runtime system resources and insure that loaded application components with accurate RDLs will always have sufficient runtime system resources even if all application components loaded on the portable device are operating simultaneously.

The steps depicted in FIG. 5 are employed when application components are loaded into the portable device and run on the portable device. According to the present invention, maximum required runtime resources are reserved for the application components when they are loaded into the portable device. One or more of the loaded application components are then run using no more than their reserved maximum required runtime resources.

Referring to FIG. 5, at step 116, the portable device reserves the maximum runtime resources required by each application component when it is loaded into the portable device. In the preferred embodiment, RAM is reserved for the loaded application components by using the component manager 41 (FIG. 3) to instruct the VM 36 to allocate a quantity of RAM to each loaded application component that is equal to the RAM requirement, determined in step 102. In addition, threads are reserved by using the component manager 41 to write the thread requirements, determined in step 102, to a thread table accessible by the VM 36. Further, sockets are reserved by using the component manager 41 to write the socket requirements, determined in step 102, to a socket table accessible by the VM 36. In the present invention, the maximum required runtime resources reserved for each loaded application component are reserved as long as the loaded application component is in the portable device. Hence, each loaded application components will always have access to its reserved maximum runtime resources.

It should be noted that the reserved maximum runtime resources for loaded application components are reserved generally, not specifically. For example, if the total runtime system resource in a portable device included 8 MB of RAM, 100 threads, and 10 sockets and 2 MB of RAM, 25 threads, and 2 sockets are reserved for a loaded application component, the loaded application component will always have 2 MB of RAM, 25 threads, and 2 sockets available for its use, but not necessarily the same 2 MB of RAM, 25 threads, and 2 sockets.

At step 118, one or more of the loaded application components are opened on the portable device in a known manner. At step 120, runtime resources requested by the one or more loaded application components are monitored. In a preferred embodiment, the VM 36 (FIG. 3) monitors RAM used by the one or more loaded application components every time the one or more loaded application components access the RAM. Also, in the preferred embodiment, the component manager 41 (FIG. 3) monitors the total number of threads the one or more loaded application components are currently using every time a thread is requested by the one or more loaded application components and monitors the total number of sockets the one or more loaded application components are currently using every time a socket is requested by the one or more loaded application components. The amount of RAM, the number of threads, and the number of sockets used by each one or more loaded application component running on the portable device varies greatly depending on what the operator is doing.

At step 122, the runtime resources in use plus runtime resources requested are compared to the maximum required runtime resources reserved for each one or more loaded application component. In a preferred embodiment, RAM in use plus RAM requested is compared to the RAM requirement using the function within the VM 36 (FIG. 3) that determines if all of the RAM reserved for each one or more loaded application component is in use. Also, in the preferred embodiment, threads in use plus threads requested are compared to the thread requirement stored in the thread table by the component manager 41 (step 116) for each one or more loaded application component and sockets in use plus sockets requested are compared to the socket requirement stored in the socket table by the component manger 41 (step 116) for each one or more loaded application component.

At step 124, a decision is made regarding whether requested runtime resources for an application component would cause the runtime resources in use to exceed the maximum required runtime resources reserved for the application component. If the requested runtime resources cause the maximum required runtime resources to be exceeded, the application component will be prevented from using additional requested runtime resources at step 126 and, preferably, an indicator will be generated indicating that the requested runtime resources are not available. If the requested runtime resources do not cause the maximum required runtime resources to be exceeded, processing proceeds to step 128.

In a preferred embodiment, the decision regarding RAM is made by a function within the VM 36 (FIG. 3) invoked when RAM is requested from the VM 36. If all the RAM reserved for an application component is already used, the function will prevent the use of additional RAM and generate an "Out of Memory Error." In addition, in the preferred embodiment, the component manager 41 (FIG. 3) will make the decision regarding threads and sockets. If a request for a new thread by an application component will cause thread use by the application component to exceed thread requirements on the thread table for the application component, the use of additional threads will be prevented and an indicator will be generated. Also, if a request for a new socket by the application component will cause socket use by the application component to exceed socket requirements on the socket table for the application component, the use of additional sockets will be prevented and an indicator will be generated.

At step 128, a decision is performed to determine if any loaded application components are open. If any loaded application components are open, the process will resume at step 120. If all application components are closed, the process will end at step 130. In the preferred embodiment, the component manager 41 (FIG. 3) monitors the loaded application components and determines if any loaded application components are still open.

Conceptually, the steps of FIG. 5 insure that application components loaded on a portable device will always have the maximum runtime resource requirements as determined from its RDL even if every loaded application component in the portable device is running simultaneously. For example, assume that the total runtime system resources in a portable device are 8 MB of RAM, 100 thread, and 10 sockets and first and second loaded application components each have maximum runtime resource requirements of 4 MB of RAM, 50 threads, and 5 sockets based on information from their associated RDLs. Assuming that the RDLs contain accurate information, both application components could be run simultaneously without depleting the runtime resources of the portable device. If, however, the first loaded application actually needed 6 MB of RAM, 55 threads, and 5 sockets, the runtime resource would be depleted when both application components were running if both application components were allowed to use all the runtime resources they needed. The steps of FIG. 5 prevent the depletion of runtime system resources by reserving resources for use by the loaded application components when they are loaded into the portable device and allowing the loaded application components to use no more than the reserved runtime resources. Hence, even though the first loaded application component needs 6 MB of RAM, 55 thread, and 5 sockets, the first loaded application component will be restricted to 4 MB of RAM, 50 threads, and 5 sockets in accordance with the information in its associated RDL. Therefore, the second application component will have 5 MB of RAM, 50 threads, and 5 sockets available for its use even if both loaded application components were running at the same time and attempting to use the maximum runtime resources that they needed.

FIG. 6 is a flow diagram depicting the steps for removing a loaded application component from the portable device. At step 132, loaded application components and their associated maximum reserved runtime resources are displayed to an operator. In a preferred embodiment, the associated maximum reserved runtime resources are determined by the component manager 41 (FIG. 3) from the RDLs 43 associated with the loaded application components.

At step 134, a selection request for removing one or more of the loaded application components is received at the portable device from the operator. The one or more loaded application components are removed by the operator of the portable device if the loaded application components are no longer needed/wanted by the operator or to free CARSRMAX as in steps 108-112 (FIG. 4).

At step 136, the one or more loaded application components are removed from the portable device in a known manner.

At step 138, runtime resources reserved for use by the removed one or more loaded application components are released for use by one or more new application components being loaded into the portable device. In the preferred embodiment, when one or more application components are removed from the device, the component manager 41 (FIG. 3) instructs the VM 36 to deallocate the RAM reserved for the removed one or more application components. Also, in the preferred embodiment, when one or more application components are removed from the device, the component manager 41 removes the application components' thread requirement entries from the thread table and socket requirement entries from the socket table. By deallocating the RAM, removing thread requirements from the thread table, and removing socket requirements from the socket table, the CARSRMAX is increased.

The present invention provides many advantages including:

1. Poorly designed or destructive application components cannot deplete a portable device's runtime resources by, for example, using all of the portable device's memory, threads, and/or sockets.

2. All application components can be run simultaneously without depleting runtime system resources.

2. Loaded application components will have a guaranteed amount of runtime resources, such as RAM, threads, and sockets available for their use at all times.

3. Loaded application components can be profiled, thereby allowing an operator to see the amount of runtime system resources that will be added to the CARSRMAX by removing one or more loaded application components and releasing their runtime resources.

4. Runtime resources required by a set of application components can be calculated and compare to the CARSRMAX before an attempt is made to load these application components into the portable device, thereby insuring that runtime resources will be sufficient if the set of application components are loaded into the portable device.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A processor-implemented runtime resource management method for use with a portable device, said method comprising the steps of:

identifying one or more new application components scheduled to be loaded and stored on said portable device, each of said one or more new application components having a resource description list (RDL) associated therewith, said RDL identifying maximum required runtime resources that will be used when the respective application component is running;

determining maximum required runtime resources for said one or more new application components from each said associated RDL;

reserving maximum runtime resources required for running each application component stored in flashed memory of the portable device as defined by said RDL;

wherein said reserving step comprises:

allocating a segment of RAM within the portable device to each of application components stored in flash memory based on RAM requirements in said RDL associated with each of said application components, said allocated segment of RAM being for use by said application component stored in flash memory;

writing thread requirements to a thread table for each of said application component stored in flash memory based on thread requirements in said RDL associated with each said application components stored in flash memory;

writing socket requirement to a socket table for each of said application component stored in flash memory based on socket requirements in said RDL associated with each of said application component stored in flash memory; and determining a CARSRMAX (Currently Available Runtime System Resources of the portable device assuming all already loaded application components are simultaneously using the respective MAXimum amount of runtime resources reserved for their use) of said portable device;

comparing, using said processor, said maximum required runtime resources for said one or more new application components to said CARSRMAX; and prohibiting, using said processor, said one or more new application components from being loaded and stored on said portable device if said CARSRMAX is less than said maximum required runtime resources for running said one or more new application components.

2. The method of claim 1, wherein said step of determining said CARSRMAX comprises the steps of:

determining total runtime system resources of said portable device;

determining total maximum reserved runtime resources for application components stored in the flash memory of said portable device; and calculating said CARSRMAX based on said total runtime system resources and said total maximum reserved runtime resources.

3. The method of claim 2, further comprising the steps of:

removing one or more of said application components stored in the flash memory of said portable device; and releasing maximum runtime resources reserved for said one or more application components removed from the flash memory of said portable device, thereby increasing said CARSRMAX of said portable device.

4. The method of claim 1, further comprising the step of: running one or more of said application components stored in flash memory of the portable device using no more than said maximum required runtime resources reserved for each of said one or more loaded application components.

5. The method of claim 4, wherein said running step comprises the steps of:

opening said one or more application components stored in flash memory;

monitoring requests for runtime resources by each of said one or more application components stored in flash memory; and comparing runtime resources in use plus runtime resources requested to said maximum required runtime resources reserved for each of said one or more application components stored in flash memory.

6. The method of claim 1, further comprising the steps of:

running one or more of said application components stored in flash memory using said allocated segments of RAM;

monitoring RAM use, thread use, and socket use by said one or more application components stored in flash memory; and preventing each of said one or more application components from using more than said segment of RAM allocated to each of said one or more loaded application components stored in flash memory.

7. A processor-implemented system having processor for managing runtime resources in a portable device, said system comprising:

means for identifying one or more new application components scheduled to be loaded and stored on said portable device, each of said one or more new application components having a resource description list (RDL) associated therewith;

means for determining maximum required runtime resources for said one or more new application components from each said associated RDL;

means for reserving maximum runtime resources required for running each application component stored in flashed memory of the portable device as defined by said RDL;

wherein said reserving step comprises:

means for allocating a segment of RAM within the portable device to each of application components stored in flash memory based on RAM requirements in said RDL associated with each of said application components, said allocated segment of RAM being for use by said application component stored in flash memory;

means for writing thread requirements to a thread table for each of said application component stored in flash memory based on thread requirements in said RDL associated with each said application components stored in flash memory;

means for writing socket requirements to a socket table for each of said application component stored in flash memory based on socket requirements in said RDL associated with each of said application component stored in flash memory; and means for determining a CARSRMAX (Currently Available Runtime System Resources of the portable device assuming already loaded application components are using the MAXimum amount of runtime resources reserved for their use) of said portable device;

processing means for comparing said maximum required runtime resources for said one or more new application components to said CARSRMAX; and processing means for prohibiting said one or more new application components from being loaded and stored on said portable device if said CARSRMAX is less than said maximum required runtime resources.

8. The system of claim 7, wherein said means for determining said CARSRMAX comprises:

means for determining total runtime system resources of said portable device;

means for determining total maximum reserved runtime resources for application components stored in the flash memory of said portable device; and means for calculating said CARSRMAX based on said total runtime system resources and said total maximum reserved runtime resources.

9. The system of claim 8, further comprising:

means for removing one or more of said application components stored in the flash memory of said portable device; and means for releasing maximum runtime resources reserved for said one or more application components removed from the flash memory of said portable device, thereby increasing said CARSRMAX of said portable device.

10. The system of claim 7, further comprising:

means for running one or more of said application components stored in flash memory of the portable device using no more than said maximum required runtime resources reserved for each of said one or more loaded application components.

11. The system of claim 10, wherein said means for running comprises:

means for opening said one or more application components stored in flash memory;

means for monitoring requests for runtime resources by each of said one or more application components stored in flash memory; and means for comparing runtime resources in use plus runtime resources requested to said maximum required runtime resources reserved for each of said one or more application components stored in flash memory.

12. A processor-implemented computer program product for managing system resources in a portable device, said computer program product comprising:

computer readable program code embodied in a computer readable medium, the computer readable program code comprising at least:

computer readable program code for identifying one or more new application components scheduled to be loaded and stored on said portable device, each of said one or more new application components having a resource description list (RDL) associated therewith;

computer readable program code for determining maximum required runtime resources for said one or more new application components from each said associated RDL;

computer readable program code for reserving maximum runtime resources required for running each application component stored in flashed memory of the portable device as defined by said RDL;

wherein said reserving step comprises:

computer readable program code for allocating a segment of RAM within the portable device to each of application components stored in flash memory based on RAM requirements in said RDL associated with each of said application components, said allocated segment of RAM being for use by said application component stored in flash memory;

computer readable program for writing thread requirements to a thread table for each of said application component stored in flash memory based on thread requirements in said RDL associated with each said application components stored in flash memory;

computer readable program code for writing socket requirements to a socket table for each of said application component stored in flash memory based on socket requirements in said RDL associated with each of said application component stored in flash memory; and computer readable program code for determining a CARSRMAX (Currently Available Runtime System Resources of the portable device assuming already loaded application components are using the MAXimum amount of runtime resources reserved for their use) of said portable device;

computer readable program code for comparing, using said processor, said maximum required runtime resources for said one or more new application components to said CARSRMAX; and computer readable program code for prohibiting, using said processor, said one or more new application components from being loaded and stored on said portable device if said CARS RMAX is less than said maximum required runtime resources.

13. The product of claim 12, wherein said computer readable program code for determining said CARSRMAX comprises:

computer readable program code for determining total runtime system resources of said portable device;

computer readable program code for determining total maximum reserved runtime resources for application components stored in the flash memory of said portable device; and computer readable program code for calculating said CARSRMAX based on said total runtime system resources and said total maximum reserved runtime resources.

14. The product of claim 13, wherein said computer readable program code embodied in a computer readable medium further comprises:

computer readable program code for removing one or more of said application components stored in the flash memory of said portable device; and computer readable program code for releasing maximum runtime resources reserved for said one or more application components removed from the flash memory of said portable device, thereby increasing said CARSRMAX of said portable device.

15. The product of claim 12, wherein said computer readable program code embodied in a computer readable medium further comprises:

computer readable program code for running one or more of said application components stored in flash memory of the portable device using no more than said maximum required runtime resources reserved for each of said one or more application components stored in flash memory.

16. The product of claim 15, wherein said computer readable program code for running comprises:

computer readable program code for opening said one or more application components stored in flash memory;

computer readable program code for monitoring requests for runtime resources by each of said one or more application components stored in flash memory;

computer readable program code for comparing runtime resources in use plus runtime resources requested to said maximum required runtime resources reserved for each of said one or more application components stored in flash memory; and computer readable program code for preventing each of said one or more application components stored in flash memory from using more than said maximum required runtime resources reserved for each of said one or more application components stored in flash memory.

* * * * *